(12) United States Patent
Bynum et al.

(10) Patent No.: US 7,220,029 B2
(45) Date of Patent: May 22, 2007

(54) LAMP ASSEMBLY HAVING VARIABLE FOCUS AND DIRECTIONALITY

(75) Inventors: Stephen A. Bynum, Cookeville, TN (US); Philip S. Hall, Cookeville, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 175 days.

(21) Appl. No.: 11/054,900

(22) Filed: Feb. 10, 2005

(65) Prior Publication Data

US 2005/0174791 A1    Aug. 11, 2005

Related U.S. Application Data

(60) Provisional application No. 60/543,645, filed on Feb. 11, 2004.

(51) Int. Cl.
*B60Q 3/02* (2006.01)
*F21V 14/06* (2006.01)
*F21V 23/04* (2006.01)
*F21V 21/30* (2006.01)

(52) U.S. Cl. ............... 362/490; 362/269; 362/277; 362/319; 362/394; 362/488; 362/512; 362/520; 362/523

(58) Field of Classification Search ............... 362/394, 362/471, 479, 480, 488, 490, 512, 520, 523, 362/269, 277, 319; 315/84
See application file for complete search history.

(56) References Cited

U.S. PATENT DOCUMENTS 2,116,317 A    5/1938   Marshall et al. ............ 362/490
2,116,324 A    5/1938   Prance ........................ 362/490

(Continued)

FOREIGN PATENT DOCUMENTS

DE          33 33 048 A1     3/1985

(Continued)

*Primary Examiner*—Alan Cariaso
(74) *Attorney, Agent, or Firm*—Dickinson Wright PLLC (57) ABSTRACT

A lighting assembly (10) is adjustable between flood and spot lighting conditions for selectively illuminating an interior passenger compartment in a motor vehicle. The assembly (10) includes a housing (16) which clamps to a supporting member, such as a headliner (12), via a sleeve (18) interacting with a rotary cam lock (22). An LED light source (26) is orbitally supported within the housing (16) for projecting light in a directionally adjustable manner. A lens (50) is disposed in the light path (28) and is moveable between an extended spot position for task lighting and a retracted flood position for general illumination within the interior compartment. A switch (74) is responsive to movement of the lens (50) into its spot position for automatically energizing the LED (30). The switch (74) opens, thus de-energizing the LED (30) when the lens (50) is returned to its flood condition. A lighting control circuit (78, 78') is responsive to an override signal, such as from a door switch (80, 80'), for independently activating the light source (26) when the lens (50) is in its flood position. The light source (26) is supported for orbital movement within the housing (16) by a gimbal mechanism which includes an inner gimbal (38) carried in a cross (40). Pintals (42, 44) establish intersecting perpendicular axis (A,B) to accomplish the orbital movement. A latch mechanism (64) cooperates with leaf springs (62) by controlling movement of the lens (50) between its flood and spot conditions by a repeated push impulse applied by the finger of an operator. The switch (74) is incorporated into the leaf springs (62).

38 Claims, 5 Drawing Sheets

U.S. PATENT DOCUMENTS

| | | | |
|---|---|---|---|
| 2,783,365 A * | 2/1957 | Wilfert | 362/490 |
| 3,852,585 A | 12/1974 | Brunger | 362/546 |
| 4,499,528 A | 2/1985 | Hawlitzki | 362/275 |
| 4,739,224 A * | 4/1988 | Geerlings | 315/84 |
| 4,760,500 A | 7/1988 | Peng | 362/490 |
| 5,070,434 A | 12/1991 | Suman et al. | 362/490 |
| 5,508,897 A | 4/1996 | Van Order | 362/490 |
| 5,951,155 A | 9/1999 | Lanser | 362/490 |
| 6,461,024 B1 | 10/2002 | Becker et al. | 362/331 |
| 6,502,969 B2 | 1/2003 | Logel et al. | 362/490 |
| 6,578,994 B1 | 6/2003 | Beyerlein | 362/490 |
| 6,796,690 B2 | 9/2004 | Bohlander | 362/471 |
| 6,799,875 B2 * | 10/2004 | Flokstra et al. | 362/488 |
| 2002/0034076 A1 | 3/2002 | Becker et al. | 362/331 |
| 2002/0145871 A1 | 10/2002 | Yoda | 362/241 |
| 2003/0133307 A1 | 7/2003 | Sugihara et al. | 362/490 |

FOREIGN PATENT DOCUMENTS

| | | |
|---|---|---|
| DE | 195 44 807 A1 | 6/1997 |
| EP | 1 118 501 A2 | 11/2000 |

* cited by examiner

LAMP ASSEMBLY HAVING VARIABLE FOCUS AND DIRECTIONALITY

BACKGROUND OF THE INVENTION

1. Field of the Invention

This invention relates generally to lighting assemblies for illuminating the interior passenger compartment of a motor vehicle, and more specifically toward a lighting assembly which is adjustable between flood and spot lighting conditions and also directionally adjustable.

2. Related Art

Lighting assemblies are well known for use in motor vehicle interior cabins, trunks, engine compartments, and other environments where light is needed. Such lighting assemblies provide direct lighting, indirect lighting, and backlighting, among other applications, and have become smaller, more efficient, more durable and longer lasting. Typically, indirect, or general illumination lighting is accomplished by dome lamp assemblies or other lighting device which disperses light over a large area. This is in contrast to direct or task lighting applications, such as map or reading lights, where light from the light source is focused in a relatively narrow area.

Typically, the flood and spot lighting features are accomplished by separate lighting assemblies dedicated to each function. For example, U.S. Pat. No. 6,502,969 to Logel et al. discloses a multi-function lighting assembly in which separate lighting devices are required to accomplish the flood and spot lighting functions. Although Logel uses a unitary structure to accomplish all of these functions, the overall assembly is nevertheless large, cumbersome and expensive to manufacture.

Variable focus lighting assemblies have been proposed with limited functionality. For example, U.S. Pat. No. 5,070,434 to Suman et al. discloses an incandescent bulb with a reflector that can be repositioned to focus and unfocus the light path. The Suman et al. light assembly is deficient however, in that the light beam pattern is directionally adjustable only when in the spot lighting condition; it is immobile in the flood lighting condition. Furthermore, multiple user inputs are required to turn the light assembly on and off, and to refocus the light beam pattern. These multiple inputs can present an inconvenience, as well as a distraction to the driver.

Accordingly, there exists a need for an improved lighting assembly which is adjustable between flood and spot lighting conditions and which is easier to operate, less distracting for a driver, and fully directionally adjustable in both flood and spot lighting conditions.

SUMMARY OF THE INVENTION

The subject invention overcomes the disadvantages and shortcomings of the prior art by providing a lighting assembly which is adjustable between flood and spot lighting conditions for selectively illuminated the interior passenger compartment of a motor vehicle. The lighting assembly comprises a housing for attaching the assembly to a supporting member in an interior compartment of the motor vehicle. A light source is carried in the housing for projecting light along a light path. A power input is operatively connected to the light source for selectively energizing the light source. An optical member is positioned so as to influence the light path. The optical member is moveable between a flood position wherein light from the light source is dispersed over a generally wide area within the passenger compartment and a spot position wherein light from the light source is focused over a generally narrow area within the passenger compartment. A switch is responsive to movement of the optical member for automatically interrupting the operative connection between the power input and the light source when the optical member is moved to the flood position, and automatically restoring the operative connection when the optical member is moved to the spot position so as to energize the light source and thereby illuminate the passenger compartment with a focused beam of light. Thus, the single user input action of refocusing the light source from flood to spot lighting conditions automatically energizes the light source so as to provide spot lighting functionality. Conversely, returning the optical member to its flood position automatically de-energizes the light source.

In the preferred embodiment of the invention, a separate lighting control circuit is provided which is responsive to an override signal for activating the light source independently of the switch when the optical member is in its flood position. For example, the lighting control circuit might be responsive to a door switch or an interior illumination control switch so that the override signal powers the light source together with other general interior illumination features during occupant entrance and exit.

According to another aspect of the subject invention, the lighting assembly is adjustable between flood and spot lighting conditions for selectively illuminating the interior passenger compartment of a motor vehicle. The lighting assembly comprises a housing for attaching the assembly to a supporting member in an interior compartment. A light source is carried in the housing for projecting light along a light path. A power input is operatively connected to the light source for selectively energizing the light source. An optical member is disposed in the light path and is moveable between a flood position wherein light from the light source is influenced by the optical member to disperse the light over a generally wide area within the passenger compartment, and a spot position wherein light from the light source is influenced by the optical member to focus over a generally narrow area within the passenger compartment. The optical member is disposed within the housing for orbital movement in both of its flood and spot positions while the light source remains energized. Thus, the light source is directionally adjustable in its spot position, which may be useful for map reading and other task oriented activities, and is also directionally adjustable in its flood lighting condition so that general illumination can be directed toward certain areas or directed away from other areas. For example, it may be desirable to direct flood lighting away from a sleeping child or to direct flood lighting toward ingress/egress areas.

According to yet another aspect of the invention, a method is provided for selectively illuminating the interior passenger compartment of a motor vehicle between flood and spot lighting conditions. The method comprises the steps of supporting a light source in an interior compartment, projecting light from the light source along a light path, selectively varying the focus of the light path between a flood condition, wherein the light is dispersed over a relatively wide area in the passenger compartment and a spot condition wherein light is focused over a relatively narrow area within the passenger compartment, automatically energizing the light source in response to the step of varying the focus of the light path to the spot condition, and automatically de-energizing the light source in response to the step of varying the focus of the light path to the flood condition.

Accordingly, these various aspects of the subject invention provide a lighting assembly for interior vehicular illumination which is both directionally and focus adjustable, and which is convenient to operate.

BRIEF DESCRIPTION OF THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
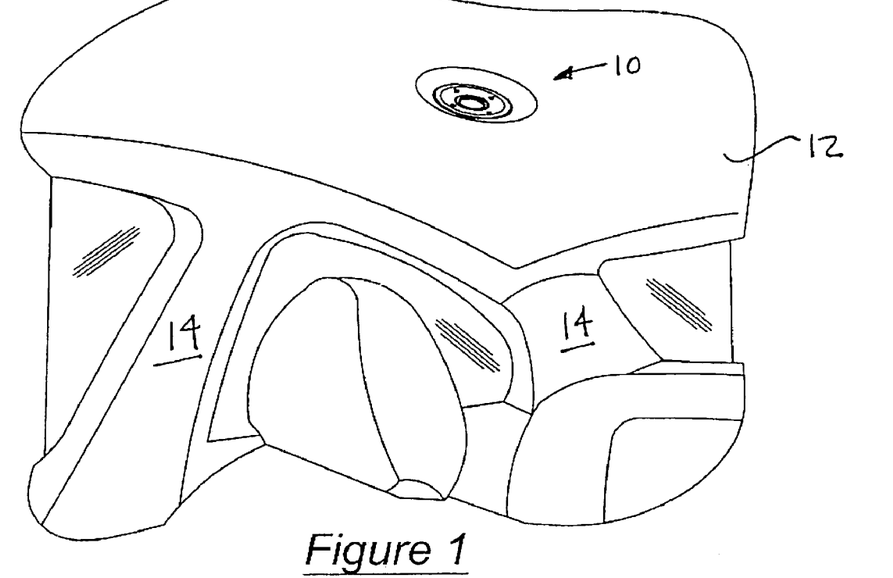
FIG. 1 is a fragmentary perspective view showing a lighting assembly according to the subject invention supported within the headliner of a motor vehicle.

Referring to the figures, wherein like numerals indicate like or corresponding parts throughout the several views, a lighting assembly according to the subject invention is generally shown at 10 in FIG. 1 positioned within a headliner 12 under the roof of a motor vehicle. For reference, B and C pillars 14 are shown extending from the headliner 12. Although mounting the lighting assembly 10 within the headliner 12 is a preferred application of the invention, the lighting assembly 10 can be conveniently located in other portions of a motor vehicle, including within the trim features of the pillars 14, in a door panel, in a console or armrest, in the dashboard, in the trunk area, in the engine compartment, or in any other convenient location. The lighting assembly 10 is adjustable between flood and spot lighting conditions so that regardless of its location within the motor vehicle, it is useful for both general and task lighting. Furthermore, the lighting assembly 10 is fully directionally adjustable in both the flood and spot lighting conditions thus providing increased functionality and convenience.

Figure 2:
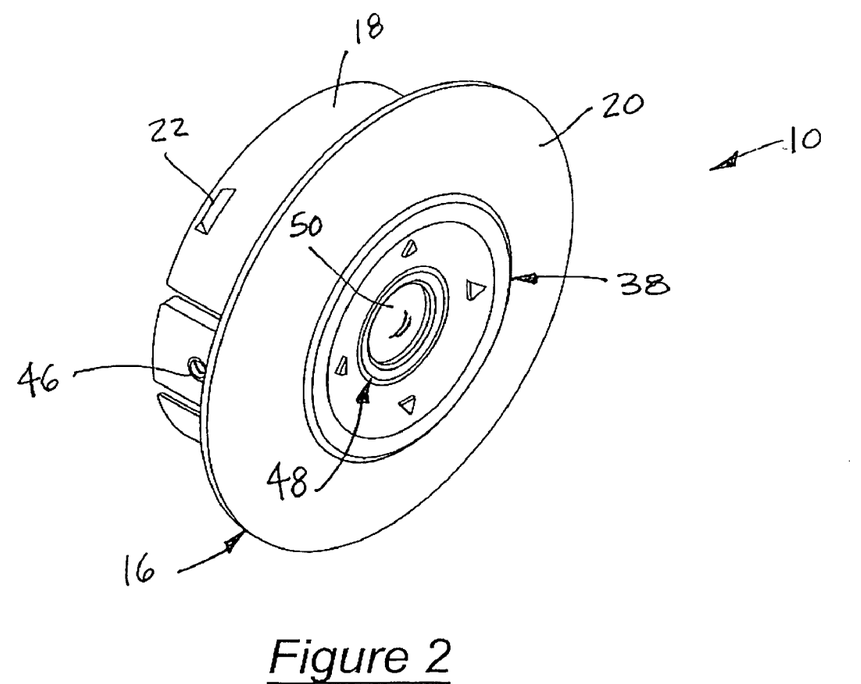
FIG. 2 is a perspective view of the subject lighting assembly.
Figure 3:
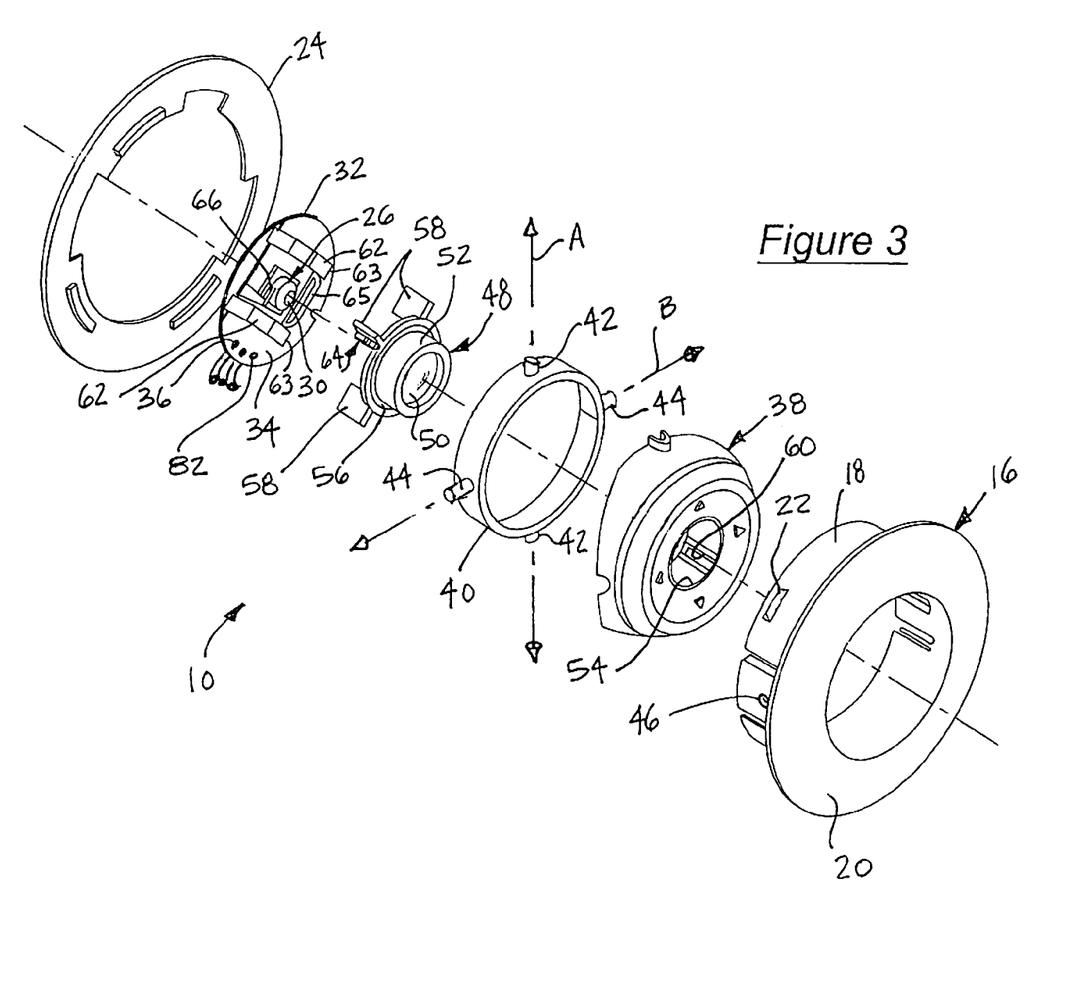
FIG. 3 is an exploded perspective view of the lighting assembly.
Figure 4:
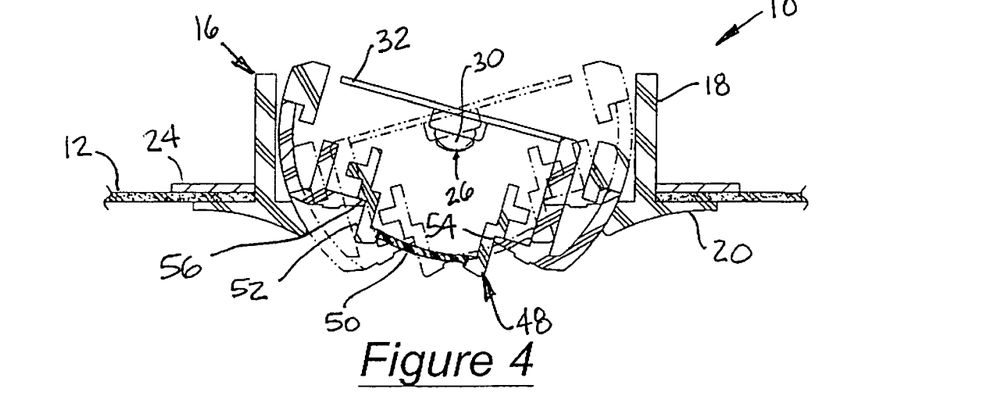
FIG. 4 is a cross-sectional view illustrating the directional mobility of the lighting assembly about a first axis A.

Referring to FIGS. 2 and 3, the lighting assembly 10 is shown including a housing, generally indicated at 16 for attaching to a supporting member, such as the headliner 12. The housing 16 may take many shapes and forms, but is shown for illustrative purposes including a cylindrical sleeve 18 and a flange-like bezel 20 which lays against the visible side of the headliner 12 to cover the hole and support the lighting assembly 10 thereagainst. The sleeve 18 is provided with a cam lock feature 22 which cooperates with a support plate 24 located on the recessed side of the headliner 12. Thus, the headliner 12 is sandwiched between the support plate 24 and the bezel 20, with the cam lock 22 securing the assembly 10 in its operative position.

Figure 5:
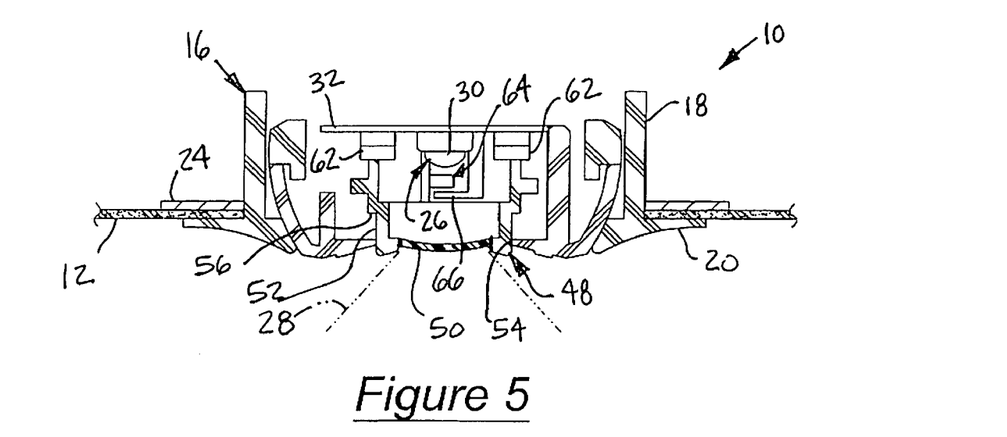
FIG. 5 is a cross-sectional view showing the optical member disposed in the flood position with the light path dispersed over a generally wide area.
Figure 6:
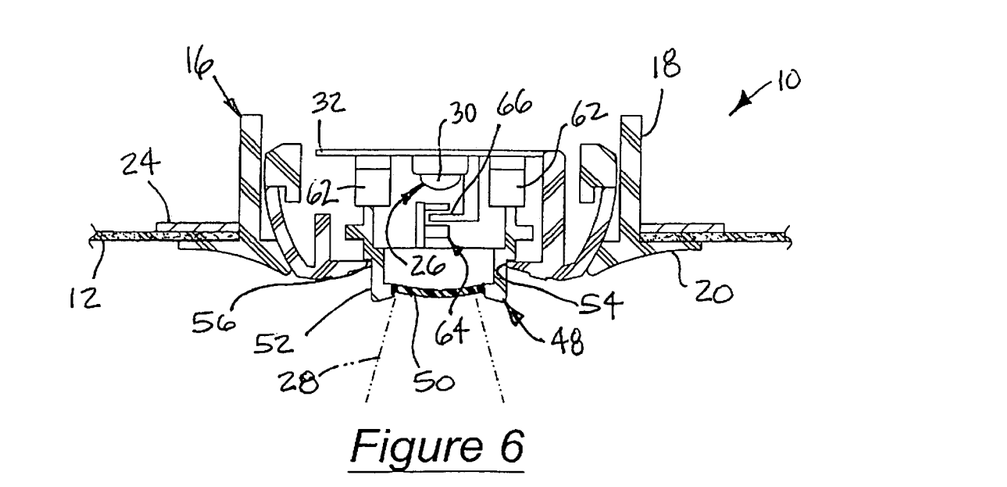
FIG. 6 is a cross-sectional view as in FIG. 5 showing the optical member disposed in the spot position with the emitted light path focused over a generally narrow area.

A light source, generally indicated at 26, is carried within the housing 16 and functions to project light along a light path which is represented by phantom lines 28 in FIGS. 5 and 6. The light source 26 can take any convenient form and embodiment, including an incandescent bulb, however in the preferred embodiment the light source 26 comprises one or more light emitting diodes (LED) 30. The LED 30 is mounted on a back plate 32 which may also contain a circuit board 34 through which electricity from a power input 36 is directed. The power input 36, which in the case of a motor vehicle application includes a DC power supply, is thus operatively connected to the light source 26, through the circuit board 34, for selectively energizing the light source 26.

The back plate 32 is joined to an inner gimbal, generally indicated at 38, which in turn is moveably supported within the housing 16. This is accomplished by pivotally connecting the inner gimbal 38 to a cross 40 via pintals 42 which lie across a common first axis A. The cross 40, in turn, is pivotally connected to the sleeve 18 of the housing 16 via perpendicular pintals 44 seated in corresponding holes 46 in the sleeve 18. The pintals 44 are aligned along a common second axis B. The first axis A and the second axis B are thus perpendicular to and intersect one another to provide free angular movement of the inner gimbal 38 relative to the housing 16. Thus, because the LED 30 and back plate 32 are fixed relative to the inner gimbal 38, they likewise enjoy a free range of orbital movement within the housing 16, thereby providing directional adjustment to the lighting assembly 10.

An optical member, generally indicated at 48, is positioned to influence the light path 28, and is moveable between a flood position and a spot position. In the flood position, light from the light source 26 is dispersed over a generally wide area within the passenger compartment, as shown in FIG. 5. By contrast, when the optical member 48 is in the spot position, light from the light source 26 is focused over a generally narrow area within the passenger compartment. The optical member 48 can take many forms. As an example, the optical member 48 could be a reflector to focus the light path 28 by varying its shape or its spatial relation to the light source 26. Preferably however, the optical member 48 is a lens 50 which is positioned within the light path 28 at all times. Alternatively, the optical member 48 may be a combination of reflector and lens 50, and can be of the type which moves into and out of the light path 28, in relative terms, as it moves between the flood and spot positions. Also, those skilled in the art will appreciate that the optical member 48 may remain stationary relative to the inner gimbal 38, or perhaps relative to the housing 16, while the light source 26 is moved. Regardless of the design strategy, the optical member 48 moves relative to the light source 26, and may remain in the light path 28 at all times, as shown in the accompanying figures, or may move intermittently into and out of the light path 28.

Referring now to FIGS. 5 and 6, the lens 50 is shown in its flood position in FIG. 5. The lens 50 is supported within a frame 52. The frame 52 is a cylindrical member sized for sliding relative movement within an opening 54 in the inner gimbal 38. A shoulder stop 56 extending from the frame 52 abuts the inside surface of the inner gimbal 38, behind the opening 54, for limiting travel of the frame 52. Thus, the fully extended position of the optical member 48 is shown in FIG. 6 and comprises the spot position wherein the shoulder stop 56 abuts the inner gimbal 38 and is effective for holding the lens 50 in the spot position.

In the flood condition, the lens 50 is spatially closer to the LED 30 than the when lens 50 is in the spot position. The frame 52 further includes at least one, and preferably four runners 58 which slidably engage corresponding linear tracks 60 provided in the inner gimbal 38. The runners 58 and their corresponding tracks 60 guide movement of the optical member 48 between its flood and spot positions. These runners 58 and tracks 60 hold the lens 50 in a proper orientation relative to the LED 30 so that the optical characteristics of the lens 50 perform according to design in both the flood and spot conditions. The runners 58 may be offset from one another in a non-symmetrical fashion so as to require assembly of the optical member 48 within the inner gimbal 38 in a particular orientation.

Although, in the preferred embodiment, the light source 26 comprises a single LED 30 which emits white light, it is possible to vary the color of the light path 28 by various means. For example, the lens 50 can be coated or doped with various elements to produce a particular color distribution, or a cluster of LEDs can be chosen from the red, green and blue varieties and grouped so as to emit a particular color or hue within the light path 28. Also, a different combination of colored LEDs 30 can be energized in the flood condition as opposed to the spot condition so that different hues or intensities of lighting can be emitted in the various conditions. Furthermore, it is possible to establish one or more intermediate positions of the optical member 48 relative to the light source 26 between the flood and spot positions so as to provide a graduated or infinitely variable focusing of the light path 28.

Figure 7:
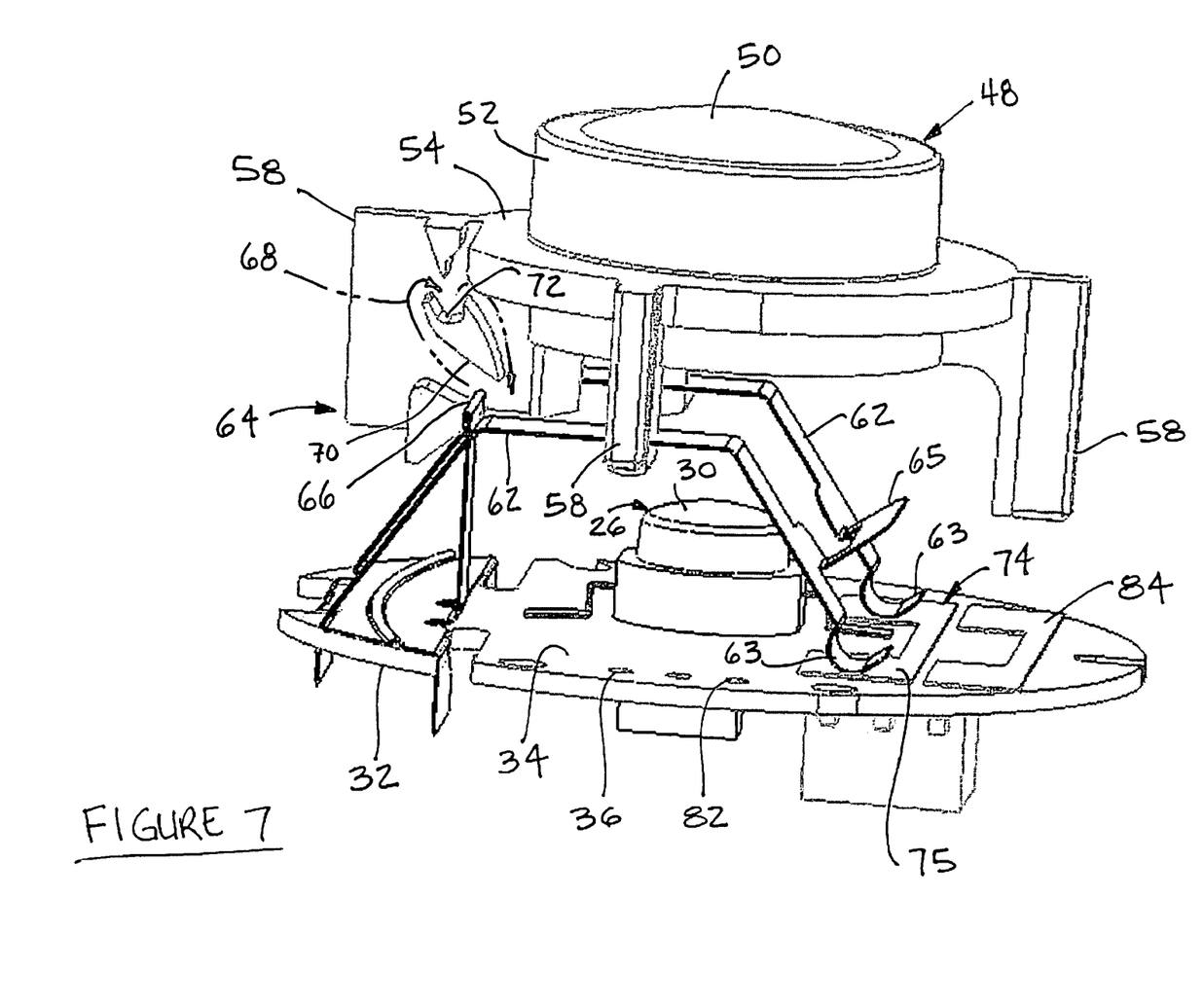
FIG. 7 is a perspective view of the lens and back plate assembly showing a catch mechanism in the spot position relative to a cam member.

In the preferred embodiment, however, the light assembly 10 is provided with only two conditions, flood lighting and spot lighting as shown in FIGS. 5 and 6. This is accomplished by providing a pair of metallic leaf springs 62 on the back plate 32 which react against the runners 58 and urge the frame 52 toward the spot light position with the shoulder stop 56 abutting the inner gimbal 38. A bridge-like stabilizer 65 may extend between the two springs 62. When the optical member 48 is moved to the flood position of FIG. 5, the leaf springs 62 are compressed. A latch mechanism, generally indicated at 64, is operatively disposed between the frame 52 and the inner gimbal 38 for holding the lens 50 in its flood position. The latch mechanism 64 includes a flexible finger 66 which extends in cantilever fashion from the back plate 32. The finger 66 is disposed in a path 68 which is formed around a cam member 70 extending from one of the runners 58. (The path 68 is represented by phantom directional arrows in FIG. 7.) The finger 66 traces a course along the path 68 as the lens 50 moves between its flood and spot positions. Thus, as shown in FIG. 7, the finger 66 is positioned below the cam member 70 when the lens 50 is in its spot position. However, as the lens 50 is forced, against the urging of the leaf springs 62, toward its flood position, the finger 66 follows the path 68 around the left edge of the cam member 70. A pocket 72 is formed in the upper portion of the cam member 70 and functions to temporarily trap the finger 66 when the lens 50 has been moved to the fully compressed flood position. Thus trapped in the pocket 72, the finger 66 holds the lens 50 in the flood condition, thereby placing the latch mechanism 64 in tension. To return the optical member 48 in the spot position, a slight further compressive force is applied to the frame 52, allowing the resilient finger 66 to lift out of the pocket and continue along the path 68 about the right surface of the cam member 70. Thus, the optical member 48 returns to the spot condition under the urging of leaf springs 62. In much the same manner as a ball point pen is clicked between extended and retracted conditions, the optical member 48 is cycled between flood and spot positions by manual pressure applied repeatedly against the lens 50. This cycling between flood and spot positions is controlled in part by the finger 66 orbiting the path 68 about the cam member 70.

The lighting assembly 10 includes a switch 74 which is responsive to movement of the optical member 48 for automatically interrupting the operative connection between the power input 36 and the light source 26 when the optical member 48 is moved to its flood position. The switch 74 automatically restores the operative electrical connection when the optical member 48 is moved to the spot position (FIG. 6). Thus, the switch 74 energizes the light source 26 with a focused beam of light 28 directed into the passenger compartment whenever the optical member 48 is moved to its spot position.

The switch 74 may take any of a variety of forms. Preferably, the switch 74 is positioned on the back plate 32, and may be incorporated into the springs 62. In this configuration, the springs 62 are formed with hook-shaped free ends 63 which rest against a common contact surface 75 when in the spot position. The contact surface 75 is electrically connected to the power input 36. The other, fixed ends of the springs 62 are operatively joined to the circuit board 34 so that electricity is transmitted from the power input 36 to the circuit board 36 via the leaf springs 62 touching the contact surface 75. This condition is illustrated in FIG. 7. When the lens 50 is moved to the flood position, the free ends 63 of the springs 62 slide out of registry with the contact surface 75, toward the right as viewed from FIG. 7, thus opening the switch 74.

Figure 8:
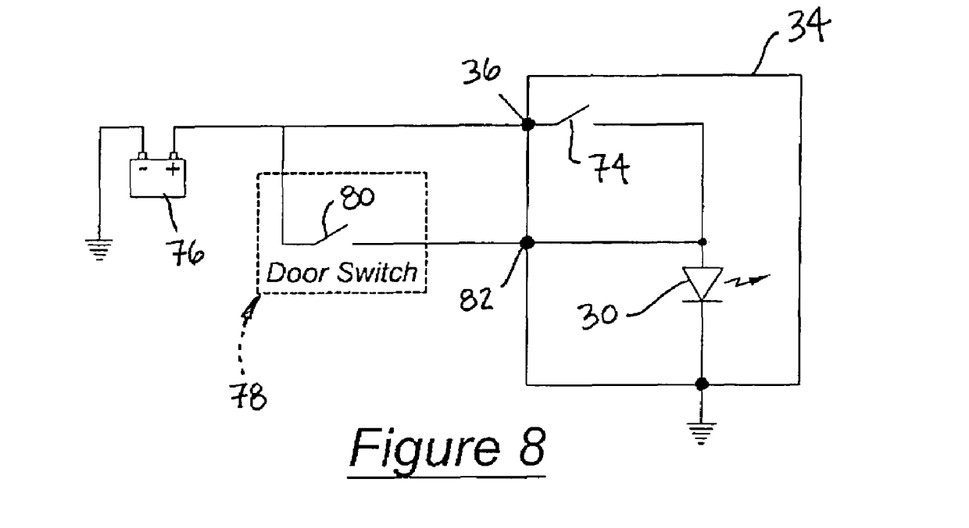
FIG. 8 is a schematic representation of an electrical circuit for controlling the subject lighting assembly.
Figure 9:
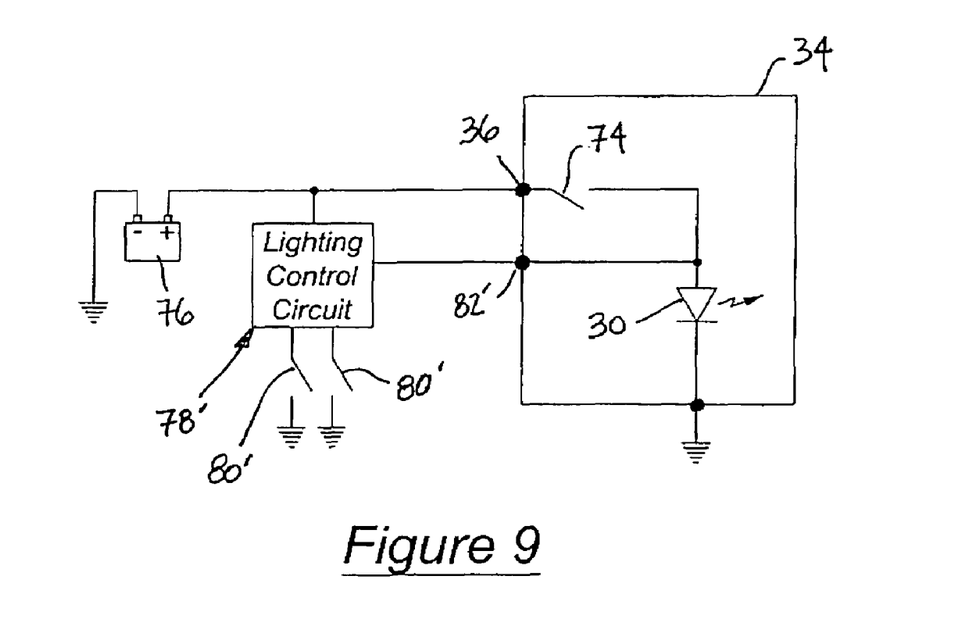
FIG. 9 is a schematic representation of an alternative electrical circuit for controlling the light assembly.

In FIGS. 8 and 9, the switch 74 is shown schematically within an overall circuit which includes a power source, such as the vehicle battery 76. The switch 74 is positioned between the battery 76 and the LED 30 so that, when closed, the LED is energized and emits light. Preferably, the circuit also includes a lighting control circuit, generally indicated at 78, which is responsive to an override signal for activating the light source 26 independently of the switch 74 when the optical member 48 is in the flood position. In the case of FIG. 8, the lighting control circuit 78 comprises a single door switch 80 which leads to an override power input 82 associated with the lighting assembly 10. Whereas the primary power input 36 receives operating power at all times (or could receive part time power via an ignition switch) so that the LED 30 is activated using this operating power via the switch 74. However, the override power input 82 receives a signal from the lighting control circuit 78 depending on the state of the door switch 80. When the door switch 80 is open, no signal is supplied to the override power input 82. When the door switch is closed, override power input 82 receives the signal in the form of operating power from the battery 76 which activates the LED 30 regardless of the position of the optical member 48.

Referring again to FIG. 7, a secondary contact surface 84 is shown adjacent the contact surface 75. The secondary contact surface 84 is electrically connected to the override power input 82. When the lens 50 is pushed to its flood position, the free ends 63 of leaf springs 62 slide into registry with the secondary contact surface 84. Thus whenever the lighting control circuit 78 calls for lighting, such as when a door is opened, the secondary contact surface 84 is energized. If the free ends 63 of leaf springs 62 happen to be touching the secondary contact surface 84, then the circuit board 34 will be energized and the LED 30 fired.

FIG. 9 shows a second example circuit which is a more typical embodiment in which the lighting control circuit 78' is connected to several door switches 80' and perhaps other inputs as well, such as an instrument panel switch (not shown). The functionality of the assembly 10 in this FIG. 9 is otherwise the same as that described above in connection with FIG. 8. More particularly, the lighting control circuit 78' allows an override signal, such as from the door switch 80, 80' or an instrument panel switch or other signal to energize the light source 26 even when the lens 50 is in its flood condition.

In practice, this arrangement allows the lighting assembly 10 to function as a dome, or general lighting feature whenever its in the retracted, flood condition so that it is energized as the doors are opened, or otherwise when the general interior illumination systems are activated. When task lighting is demanded and the lighting control circuit 78, 78' is otherwise inactive, the lighting assembly 10 can be used in its focused task lighting mode by simply moving the optical member 48 to its spot position. Thus, by simple pressure of an operator's finger against the lens 50, the lighting assembly 10 can be placed in its spot position and simultaneously activated to shine a focused path of light 28 within the passenger compartment. By reversing this single operation, the lighting assembly can be turned off and returned to its general flood illumination condition. The gimbaled fixation of the light source 26 within the housing 16 allows directional adjustment of the light path 28 both in the spot light condition and also in the flood light condition. Thus, the lighting assembly 10 is functionally simple to use, even by a vehicle driver without undue distraction or complicated multiple inputs required. Additionally, the lighting assembly 10 is highly functional by allowing reorientation of the light path 28 in both the flood and spot conditions to better accommodate occupants and various conditions.

While the invention has been described with reference to an exemplary embodiment, it will be understood by those skilled in the art that various changes may be made and equivalents may be substituted for elements thereof without departing from the scope of this invention. Obviously, many modifications and variations of the present invention are possible in light of the above teachings. It is, therefore, to be understood that within the scope of the appended claims, the invention may be practiced otherwise than as specifically described.

What is claimed is:

1. A lighting assembly adjustable between flood and spot lighting conditions for selectively illuminating the interior passenger compartment of a motor vehicle, said assembly comprising:

a housing for attaching said assembly to a supporting member in an interior compartment;

a light source carried in said housing for projecting light along a light path, wherein said light source is pivotally supported within said housing and disposed in an inner gimbal;

a power input operatively connected to said light source for selectively energizing said light source;

an optical member positioned to influence said light path and moveable between a flood position wherein light from said light source is dispersed over a generally wide area within the passenger compartment and a spot position wherein light from said light source is focused over a generally narrow area within the passenger compartment; and a switch responsive to movement of said optical member for automatically interrupting said operative connection between said power input and said light source when said optical member is moved to said flood position and automatically restoring said operative connection when said optical member is moved to said spot position to energize said light source and thereby illuminate the passenger compartment with a focused beam of light.

2. The assembly of claim 1, further including a lighting control circuit responsive to an override signal for activating said light source independently of said switch when said optical member is in said flood position.

3. The assembly of claim 1, wherein said power input includes a DC power supply.

4. The assembly of claim 1, wherein said light source comprises a light emitting diode.

5. The assembly of claim 1, further including a cross connected to said inner gimbal along a first pivotal axis, and connected to said housing along a second pivotal axis generally perpendicular to an intersecting said first pivotal axis, whereby said light source is freely angularly moveable relative to said housing.

6. The assembly of claim 1, wherein said optical member comprises a lens.

7. The assembly of claim 6, wherein said lens is spatially closer to said light source when in said flood position and spatially farther from said light source when in said spot position.

8. The assembly of claim 1, wherein said inner gimbal includes at least one linear track, and said light source includes a runner slidably engaged with said track for guiding movement of said light source between said flood and spot positions.

9. The assembly of claim 1, wherein said light source includes a back plate fixed relative to said inner gimbal.

10. The assembly of claim 9, further including a circuit board disposed on said back plate.

11. The assembly of claim 9, wherein said switch is disposed on said back plate.

12. The assembly of claim 9, further including a spring interposed between said back plate and said light source.

13. The assembly of claim 12, wherein said spring comprises a leaf spring.

14. The assembly of claim 1, further including a shoulder stop operatively disposed between said light source and said inner gimbal for holding said light source in said spot position.

15. The assembly of claim 1, further including a support plate engaging said housing through a cam lock.

16. A lighting assembly adjustable between flood and spot lighting conditions for selectively illuminating the interior passenger compartment of a motor vehicle, said assembly comprising:

a housing for attaching said assembly to a supporting member in an interior compartment;

a light source carried in said housing for projecting light along a light path, wherein said light source and said optical member are disposed on an inner gimbal;

a power input operatively connected to said light source for selectively energizing said light source;

an optical member disposed in said light path and moveable between a flood position wherein light from said light source is influenced by said optical member to disperse the light over a generally wide area within the passenger compartment and a spot position wherein light from said light source is influenced by said optical member to focus over a generally narrow area within the passenger compartment; and said optical member disposed within said housing for orbital movement in both of said flood and spot positions while said light source remains energized.

17. The assembly of claim 16, further including a switch responsive to movement of said optical member for automatically interrupting said operative connection between said power input and said light source when said optical member is moved to said flood position and automatically restoring said operative connection when said optical member is moved to said spot position to energize said light source and thereby illuminate the passenger compartment with a focused beam of light.

18. The assembly of claim 17, further including a lighting control circuit responsive to an override signal for activating said light source independently of said switch when said optical member is in said flood position.

19. The assembly of claim 18, wherein said light source includes a back plate, said switch being disposed on said back plate.

20. The assembly of claim 16, wherein said power input includes a DC power supply.

21. The assembly of claim 16, wherein said light source comprises a light emitting diode.

22. The assembly of claim 16, further including a cross connected to said inner gimbal along a first pivotal axis, and connected to said housing along a second pivotal axis generally perpendicular to and intersecting said first pivotal axis, whereby said light source is freely angularly moveable relative to said housing.

23. The assembly of claim 16, wherein said optical member comprises a lens.

24. The assembly of claim 23, wherein said lens is spatially closer to said light source when in said flood position and spatial farther from said light source when in said spot position.

25. The assembly of claim 16, wherein said inner gimbal includes at least one linear track, and said light source includes a runner slidably engaged with said track for guiding movement of said light source between said flood and spot positions.

26. The assembly of claim 16, wherein said light source includes a back plate fixed relative to said inner gimbal.

27. The assembly of claim 26, further including a circuit board disposed on said back plate.

28. The assembly of claim 26, further including a spring interposed between said back plate and said light source.

29. The assembly of claim 28, wherein said spring comprises a leaf spring.

30. The assembly of claim 16, further including a shoulder stop operatively disposed between said light source and said inner gimbal for holding said light source in said spot position.

31. The assembly of claim 16, further including a support plate engaging said housing through a cam lock.

32. A method for selectively illuminating the interior passenger compartment of a motor vehicle between flood and spot lighting conditions, said method comprising the steps of:
    supporting a light source in an interior compartment;
    projecting light from the light source along a light path;
    passing the light path through a lens;
    selectively varying the focus of the light path between a flood condition wherein the light emanating from the lens is dispersed over a relatively wide area in the passenger compartment and a spot condition wherein light emanating from the same lens is focused over a relatively narrow area within the passenger compartment; and
    automatically energizing the light source in response to said varying the focus of the light path to the spot condition and automatically de-energizing the light source in response to said varying the focus of the light path to the flood condition.

33. The method of claim 32, further including the step of automatically activating the light source in response to an override signal when the light source is in the flood condition.

34. The method of claim 32, wherein said moving the optical member includes positioning the lens spatially closer to the light source in the flood condition and spatially farther from the light source in the spot condition.

35. The method of claim 32, wherein said moving the optical member includes guiding the lens for linear movement between the flood and spot conditions.

36. The method of claim 34, wherein said moving the optical member includes holding the lens in the flood position with a latch.

37. The method of claim 34, wherein said moving the optical member includes holding the lens in the spot position with a shoulder stop.

38. The method of claim 32 wherein said supporting the light source in an interior compartment includes moveably supporting the light source for directional adjustment.

* * * * *